(12) United States Patent
Pidcock

(10) Patent No.: US 8,262,593 B2
(45) Date of Patent: Sep. 11, 2012

(54) METHOD AND APPARATUS FOR RELIEVING LEG CRAMPS AND MASSAGING MUSCLES

(76) Inventor: Ralph M. Pidcock, Allentown, PA (US)

( * ) Notice: Subject to any disclaimer, the term of this patent is extended or adjusted under 35 U.S.C. 154(b) by 982 days.

(21) Appl. No.: 11/274,361

(22) Filed: Nov. 15, 2005

(65) Prior Publication Data

US 2006/0069333 A1   Mar. 30, 2006

Related U.S. Application Data

(63) Continuation-in-part of application No. 10/308,709, filed on Dec. 3, 2002, now Pat. No. 6,966,883.

(51) Int. Cl.
*A61H 15/00* (2006.01)
*A61H 7/00* (2006.01)
(52) U.S. Cl. ......... 601/137; 601/123; 601/128; 601/129
(58) Field of Classification Search .......... 601/112, 601/113, 118, 119, 120, 122, 123, 125, 127–129, 601/131–132, 134–137, 17, 19, 28, 63, 72, 601/94, 95, 99, 111; D24/211, 214
See application file for complete search history.

(56) References Cited

U.S. PATENT DOCUMENTS

| | | | | |
|---|---|---|---|---|
| 863,144 | A | * | 8/1907 | Bowser .......................... 601/132 |
| 1,513,475 | A | * | 10/1924 | Bell .............................. 601/123 |
| 2,253,210 | A | * | 8/1941 | Psihris ........................... 601/139 |
| D209,759 | S | | 1/1968 | Snyder |
| 3,638,939 | A | | 2/1972 | Langley |
| 4,973,183 | A | * | 11/1990 | Shevick et al. ............... 401/278 |
| 5,004,228 | A | | 4/1991 | Powers |
| 5,102,119 | A | | 4/1992 | Gerlach |
| 5,230,679 | A | | 7/1993 | Olsen |
| 5,236,333 | A | | 8/1993 | Barba, Jr. |
| 5,292,295 | A | | 3/1994 | Gerlach |
| 5,399,139 | A | | 3/1995 | Malynowsky |
| 5,518,486 | A | | 5/1996 | Sheeler |
| 5,662,562 | A | | 9/1997 | Wohlenberg |
| 5,674,163 | A | | 10/1997 | Sennett |
| 5,725,463 | A | | 3/1998 | Colonello et al. |
| 5,776,083 | A | | 7/1998 | Jacob et al. |
| 6,004,282 | A | | 12/1999 | Whitley |
| 6,027,434 | A | | 2/2000 | Gibbons |
| 6,217,488 | B1 | | 4/2001 | Bernardson |

(Continued)

FOREIGN PATENT DOCUMENTS

WO   WO 94/04227   3/1994

OTHER PUBLICATIONS

JD Riley et al., "Leg cramps: differential diagnosis and management", Am Fam Physician; Nov. 1, 1995; 52(6).

(Continued)

*Primary Examiner* — (Jackie) Tan-Uyen T. Ho
(74) *Attorney, Agent, or Firm* — Design IP

(57) ABSTRACT

Removably attached leg cramp relieving and muscle massaging elements with a variable length handle. A non-pinching foot supporting loop combined with the handle permits a user to stretch a leg to alleviate leg cramps. Muscle massaging elements combined with the handle permit a user to massage various areas of the body. The massage elements can also be used as a foot and leg exercising and blood circulation devices.

2 Claims, 11 Drawing Sheets

U.S. PATENT DOCUMENTS

| | | | |
|---|---|---|---|
| 6,283,930 B1 * | 9/2001 | Purvis et al. | 601/137 |
| 6,547,750 B2 * | 4/2003 | Huang | 601/137 |
| 6,648,804 B2 | 11/2003 | Chen | |
| 6,726,640 B2 * | 4/2004 | Ching-Chen | 601/125 |
| 2004/0024336 A1 | 2/2004 | Lin | |

OTHER PUBLICATIONS

Man-Son-Hing M. et al., "Quinine for Treatment of Nocturnal Leg Cramps", American Family Phys. Feb. 1, 1999.

R. Robinson, "Muscle spasms and cramps" Gale Encyclopedia of Medicine.

N. Snyderman M.D., "Preventing Leg Cramps", Good Housekeeping: Health Check, Sep. 1999.

Dr. Mirkin, "Night-Time Leg Cramps", 2000.

"Controlling painful leg cramps", Mayo Clinic Health Letter, Feb. 1995.

Pauline Buck, "Cramp Busters".

N. Kanaan et al., Nocturnal leg cramps: Clinically mysterious and painful—but manageable, Jun. 2001 Geriatrics, 56(6), 34.

* cited by examiner

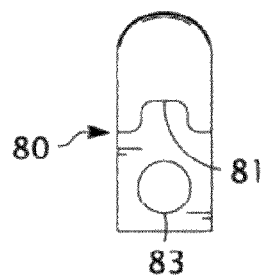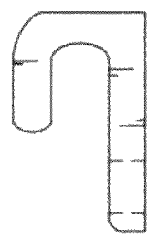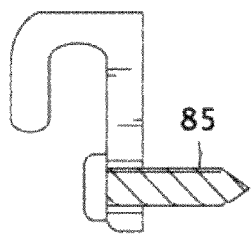
FIG. 11A   FIG. 11B   FIG. 11C
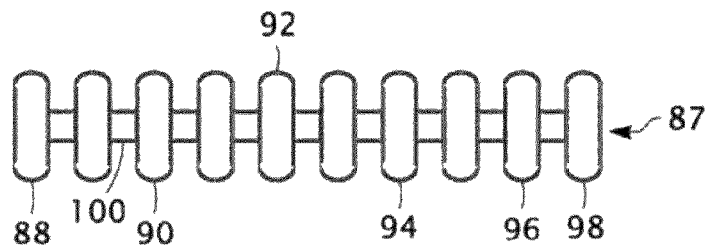
FIG. 12
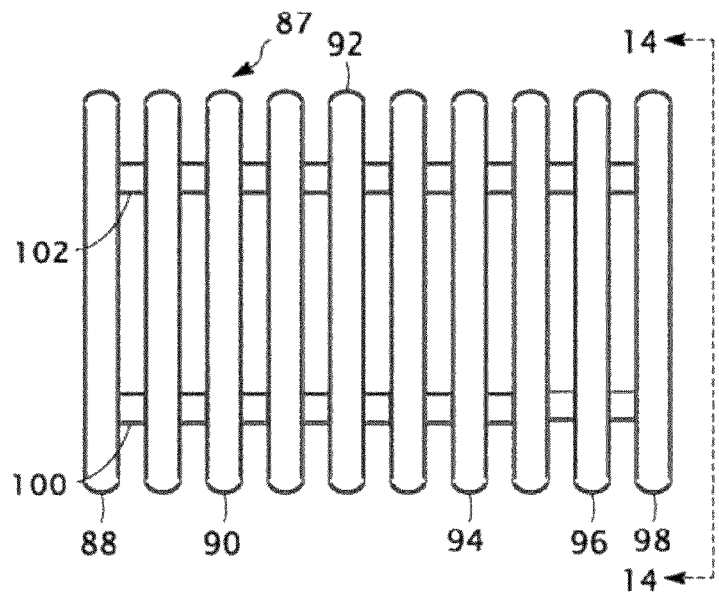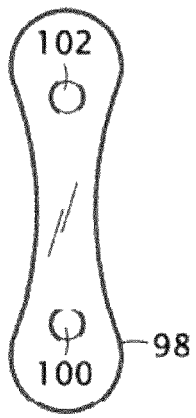
FIG. 13   FIG. 14

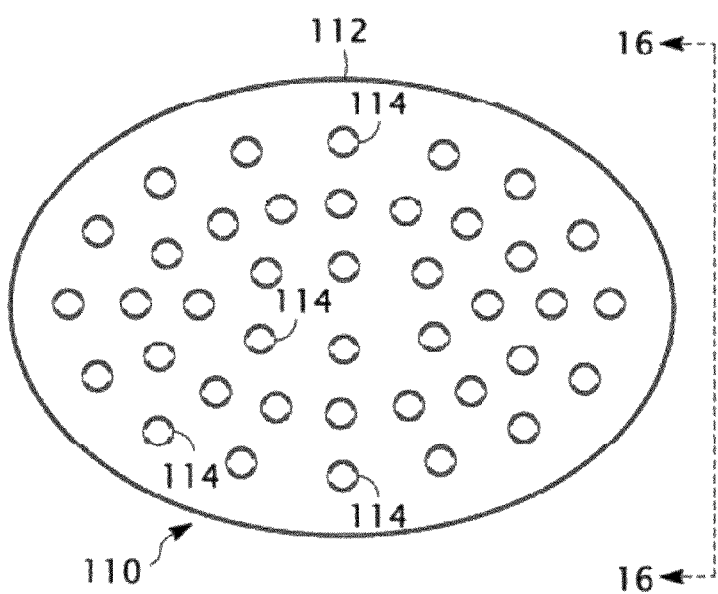 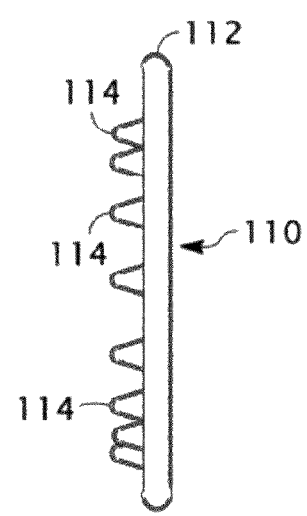
*FIG. 15*  *FIG. 16*

METHOD AND APPARATUS FOR RELIEVING LEG CRAMPS AND MASSAGING MUSCLES

CROSS REFERENCE TO RELATED APPLICATIONS

This application is a continuation-in-part of U.S. patent application Ser. No. 10/308,709, filed Dec. 3, 2002 now U.S. Pat. No. 6,966,883.

BACKGROUND OF THE INVENTION

The present invention pertains to relieving muscle cramps that commonly occur during sleep and massaging leg muscles after relieving of the cramping has been effected.

Cramping during sleep is usually caused by an exaggeration of a normal muscle reflex. When a sleeping person turns the calf muscles contract and the tendons in the leg stretch. This physical activity stimulates nerve stretch receptors in the tendon and sends a message back to the spinal cord, in essence telling the calf muscles to contract. Sometimes, the muscles remain contracted and hurt. One method of trying to relieve the leg cramp or muscle spasm is to stand on the affected leg and rise up on the ball of the foot of the affected leg, thus relieving tension in the over stretched muscles. Once tension is relaxed, the pain usually subsides, although the muscles frequently feel sore for some period of time following the episode of leg cramping.

After the leg cramps have been relieved massaging of the muscles further can relax the tension and prevent recurrence of the leg cramping, for at least a period of time.

One mechanical device for aiding a person afflicted with leg cramps is disclosed and claimed in U.S. Pat. No. 6,027,434. A major problem with the device of the '434 patent is the fact that there is a fixed length shaft between the handle and a rigid stirrup. Both the handle and the stirrup are mounted to the fixed length shaft in the same plane, thus reducing convenience for both horizontal and vertical movement of the device in order to slip the stirrup over a persons foot and to pull back toward the knee. Since leg cramps do not always occur when a person is lying on his or her back with his or her legs straight out in front of them it would be difficult with the device of the '434 patent to get relief. Furthermore, since the stirrup of the '434 device is manufactured of tubing with a cushioned covering the materials used may have a tendency to pinch the sides of a users foot as tension is exerted by pulling on the handle.

In preparation for most physical exercise or sports activity, especially where there is extensive involvement of the legs, it is prudent and recommended to perform leg-stretching exercises in order to limber up tight muscles and to tone the muscles that are not commonly used prior to the intended physical or sports activity.

As a preliminary part of the stretching exercises, it is important to stimulate blood flow to the feet and calf muscles.

Depending on the physical condition of an individual it is possible for leg muscles, both calf and thigh, to tighten up, even before extensive exercise or physical activity is commenced.

Numerous exercise devices are available to be used by a person prior to strenuous physical activity and sports activity. These are exemplified by U.S. Pat. Des. 209,759; U.S. Pat. Nos. 5,004,228; 5,230,679; 5,236,333; 5,292,295; 5,518,486; 5,662,562; 5,674,163; 5,725,463; 5,776,083 and 6,004,282.

In addition, International Publication WO 94/04227 discloses and claims a exercise device with a variable length handle.

U.S. Pat. No. 6,217,488 B1 discloses a complex foot pedal exercising device.

BRIEF DESCRIPTION OF THE INVENTION

The present invention incorporates in a single device a handle of variable length together with both a leg lift/leg exercise device and a muscle massaging device with the muscle massaging device doubling as a foot exercising device. The apparatus of the invention is compact and can be easily disassembled so the components can be used separately if desired and is readily available for travel.

The method of the present invention incorporates the use of a leather strap of comforting configuration manufactured from a vegetable tanned leather to avoid problems of allergic reaction with the leather when the device is in use.

Therefore, according to one aspect the present invention is a device permitting a user to relieve leg cramps and/or massage muscles comprising in combination an elongated handle so constructed and arranged to permit a user to have a handle of variable length means on a first end of the handle to removably position one of a flexible loop adapted to support the users foot, or a massaging element; and means on a second end of the handle to removably position one of a leather loop adapted to support the users foot, or a massaging element.

BRIEF DESCRIPTION OF THE DRAWING

FIG. 11a is a front elevational view of a mounting clip according to the present invention.

FIG. 11b is a right side elevational view of the device of FIG. 11a.

FIG. 11c is a right side elevational view of the device of FIG. 11a with a mounting fastener.

FIG. 12 is a front elevational view of a flexible massaging element according to the present invention.

FIG. 13 is a top plan view of the device of FIG. 12.

FIG. 14 is a view taken along line lines 14-14 of FIG. 13.

FIG. 15 is a bottom plan view of another flexible massaging element according to the present invention.

FIG. 16 is a view taken along lines 16-16 of FIG. 15.

DETAILED DESCRIPTION OF THE INVENTION

Leg cramping during sleep is usually caused by an exaggeration of a normal muscle reflex. A sleeping person turning during sleep causes the calf muscles to contract and the tendons to stretch. This physical movement causes nerve stretch receptors in the tendon to send a message to the spinal cord telling the calf muscles to contract.

Frequently, calf and thigh muscles have a tendency to "cramp up" or go into "spasms" during strenuous athletic activity. Many people, depending upon age, physical condition, state of tiredness, and other physical or medical conditions, experience leg muscle cramps or spasms while sitting, standing, or even lying down. It is a known fact that muscle cramps or spasms can be relieved even while a person is experiencing severe pain by flexing the foot on the affected leg.

One common, but often painful and inconvenient, method of attempting to obtain relief from leg muscle cramps or spasms is to try and stand on the affected leg and rise up on the ball of the foot, thus relieving tension in the over-stretched muscles. Once the tension is relaxed, the severe pain usually subsides, although muscles frequently feel sore for some period of time following the cramping or spasm episode. Generally massaging the muscles after the cramps or spasms have been relieved has the additional beneficial effect of further relaxing the muscles to prolong relief and to prevent recurrence of the cramping or spasms.

It is also known that it is beneficial to do stretching exercises and to massage muscles before engaging in strenuous physical activity to lessen the possibility of injury.

Figure 1:
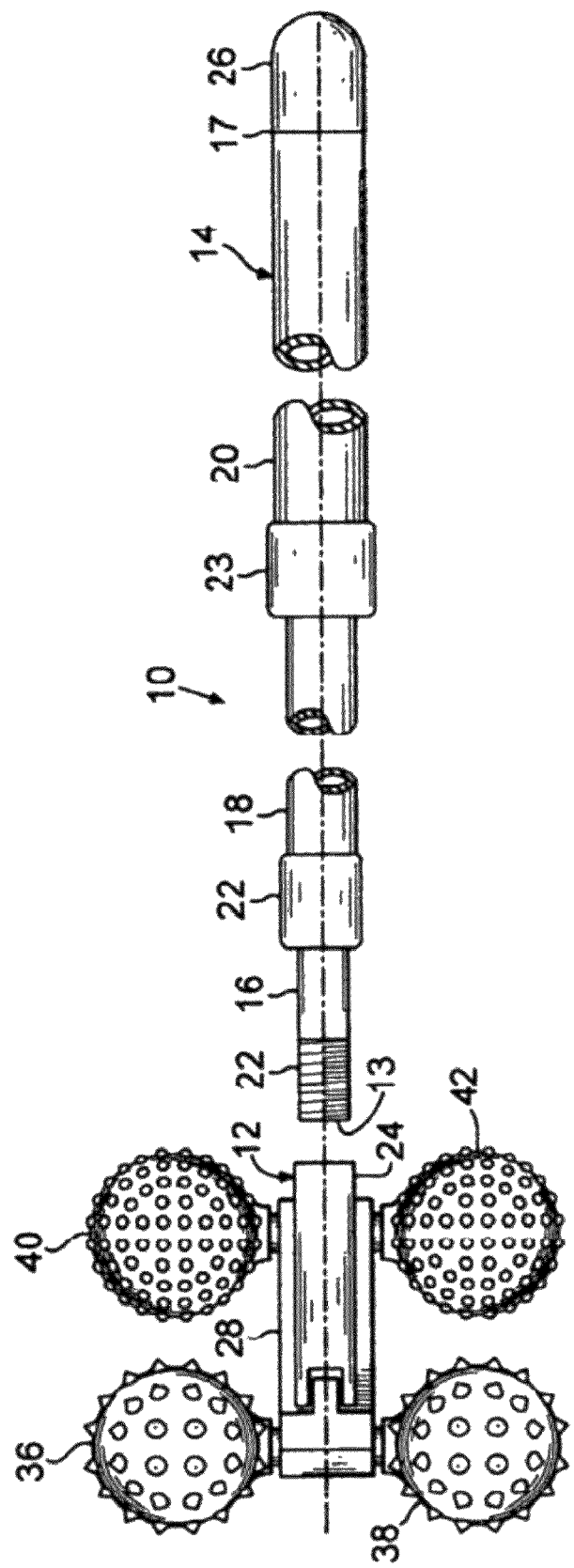
FIG. 1 is a partial fragmentary top plan view of the massaging element portion of the present invention.
Figure 2:
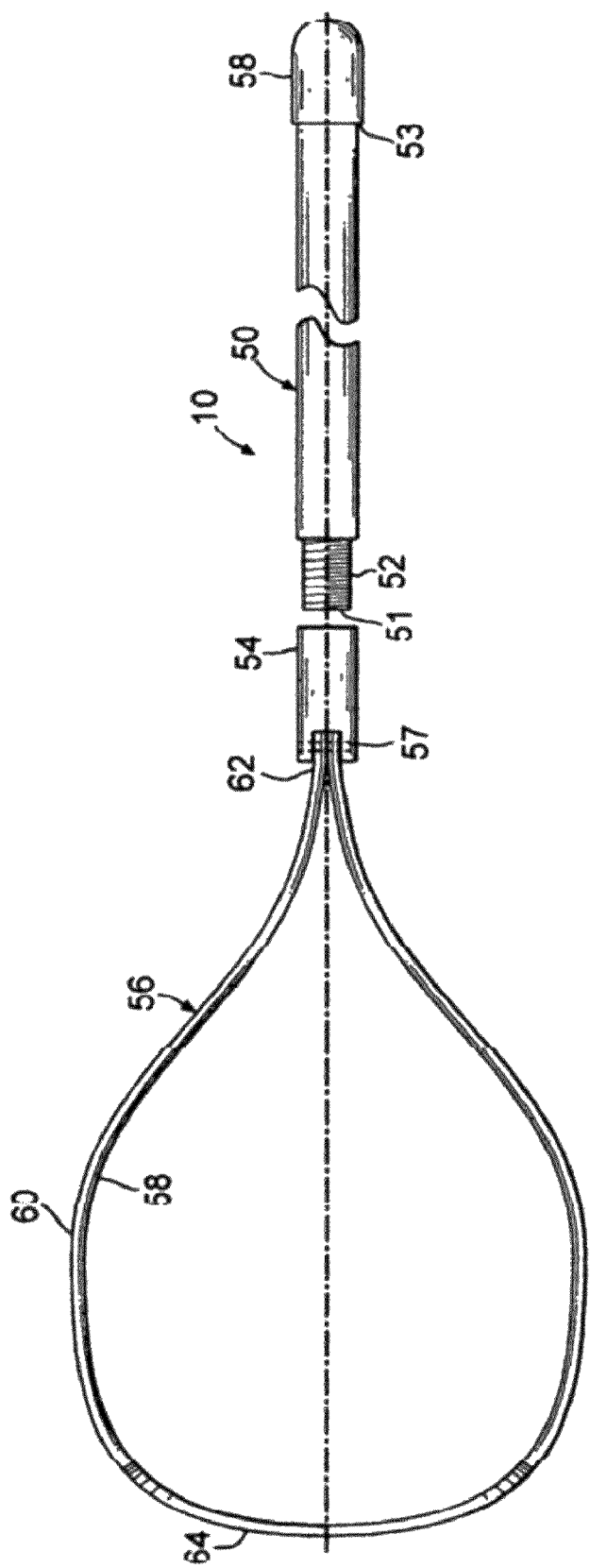
FIG. 2 is a partial fragmentary top plan view of the leg lifter/leg cramp alleviating/leg exercise element of the present invention shown with an alternate handle.
Figure 3:
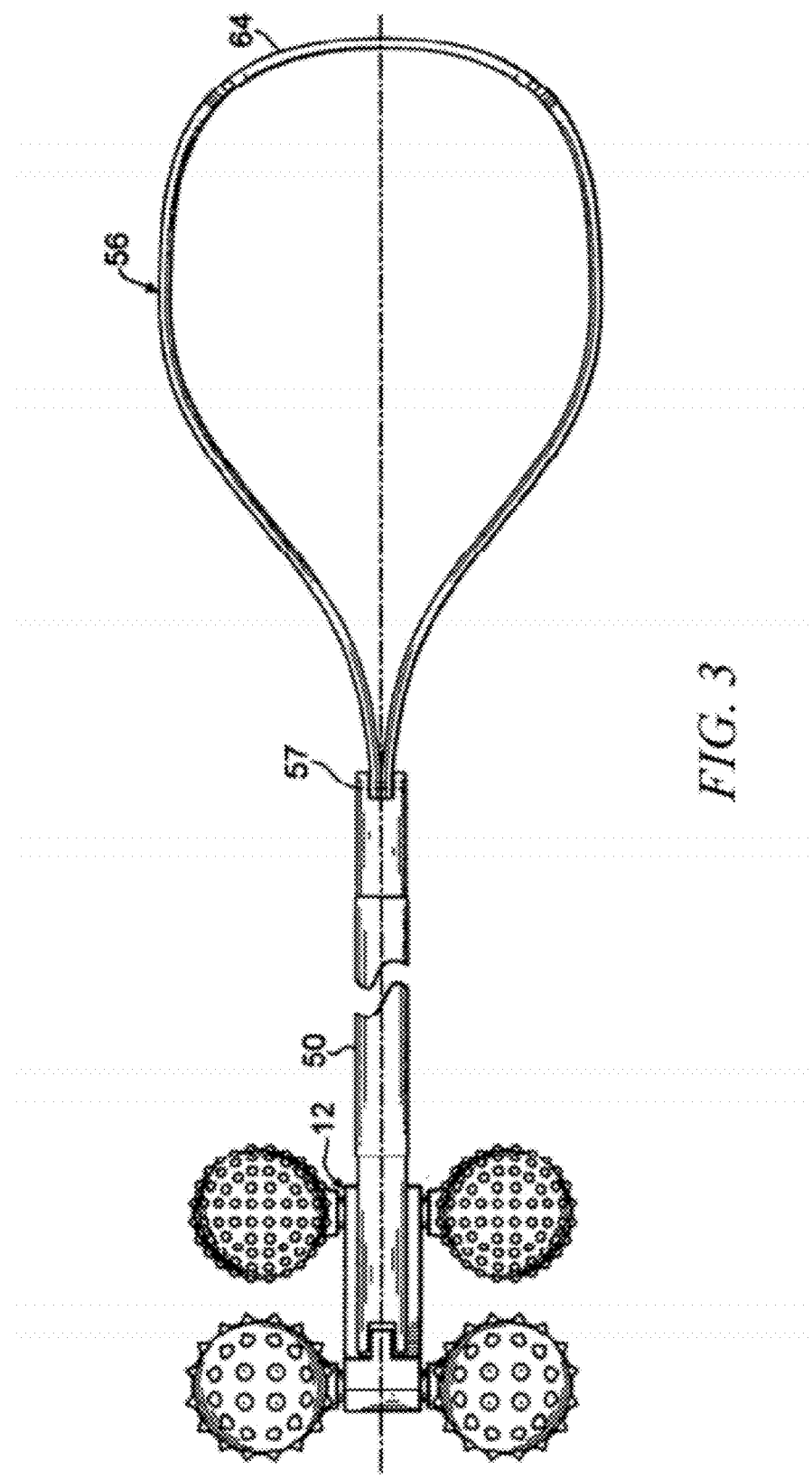
FIG. 3 is a partial fragmentary view of the device of the invention with the massaging element fixed to one end of the handle and the flexible loop fixed to the other end of the handle.

Referring to FIGS. 1 and 2 the apparatus of the present invention 10 is shown with one aspect illustrated in FIG. 1 and the other aspect illustrated in FIG. 2.

Referring to FIG. 1 the apparatus 10 is shown in conjunction with the massaging element 12 fixed to a handle 14. In FIG. 1 the handle 14 is shown as a tubular telescoping handle having telescoping sections 16, 18 and 20, which can retract inside its neighbor as is well known and can be extended and fixed at various lengths by means of collars 22, 23. The telescoping handle 14 can have any number of sections, dictated only by convenience for the user and/or manufacturer of the inventive apparatus. On a first end 13 the tubular portion 16 is threaded with suitable male threads 22, or fitted with a male threaded stub or adapter, the threaded portion being adapted to engage matching female threads in a sleeve or handle adapter 24 on massaging element 12. The second end 17 of handle 14 can be threaded and fitted with a suitable internally threaded cap 26. Thus, the handle can be used to place the massaging element on one end and the exercise loop on the other end as will hereinafter be more fully explained.

Figure 4:
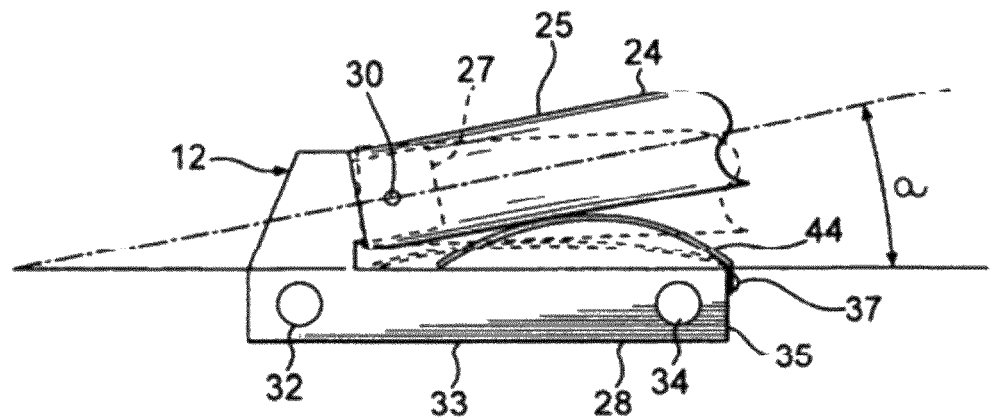
FIG. 4 is a front elevational view of the massaging element with the massaging balls removed for showing detail.
Figure 5:
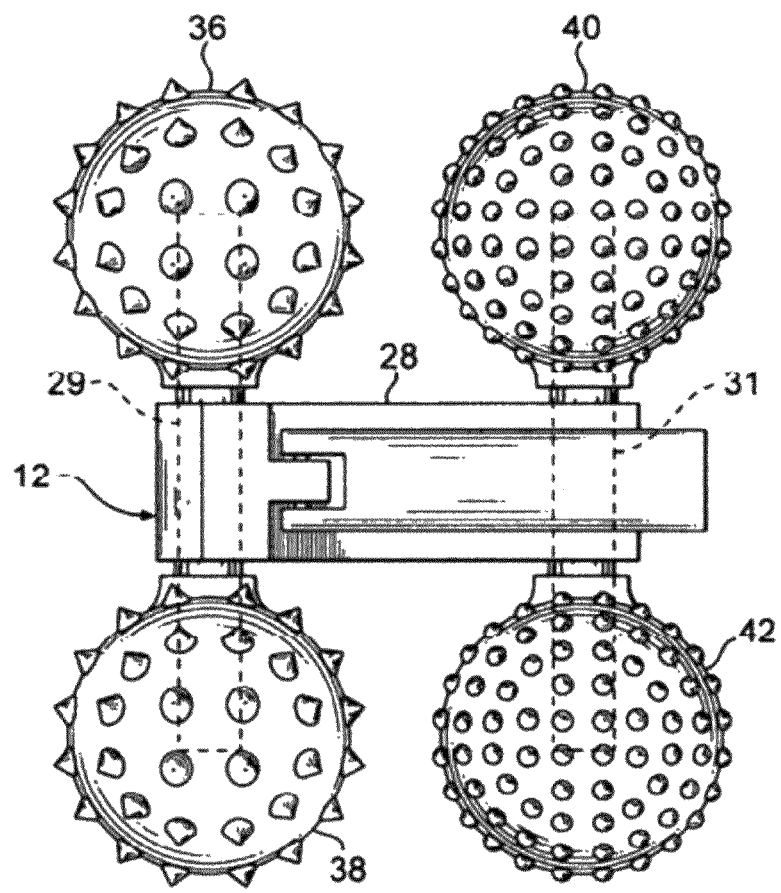
FIG. 5 is an enlarged top plan view of the massaging element according to the present invention.

The massaging element 12 as shown in FIG. 4 and FIG. 5, includes a base portion 28, which receives the mounting adapter 24 fixed in pivotal relationship thereto on a suitable projection 27 shown in dotted lines in FIG. 4 on the base portion 28 by a pin 30. The base portion 28 has a pair of apertures or passages 32, 34 to receive a pair of shafts or axles 29, 31 to which are fixed the massaging roller balls 36, 38, 40 and 42. Thus massaging roller ball pairs (36, 38, and 40, 42 respectively) can freely roll by rotation of their respective axles in passages 32 or 34. Massaging roller balls 36 and 38 can have surface protrusions in the form of cones such as shown in FIG. 5. Likewise, massaging roller balls 36, 38 can have hemispherical surface protrusions such as shown in conjunction with roller balls 40 and 42 in FIG. 5. The protrusions on the massaging roller balls are included to give a finger like massaging action to muscles. Alternatively the massaging rollers can be smooth, they can be wheel shaped as opposed to spherical or they could even be elongated rollers. The shape is only critical to the extent that the best massaging action is achieved.

Between the mounting adapter 24 and the horizontal part 33 of base portion 28 is a spring member 44, which produces a resistance to movement of the adapter 24 toward the base portion 28 as shown in FIG. 4. Thus, if the massaging element 12 is turned upside down with the adapter 24 placed on the floor or on the ground one can step on the massaging rollers 36, 38, 40, 42 and gently push on those elements to achieve a foot and leg exercising motion. This exercising motion stimulates blood flow and circulation in the feet and legs.

The massaging roller balls 36, 38, 40, 42 are preferably made of low density polyethylene, rubber or nylon and can be of varying sizes. Massaging roller balls 36, 38, 40, 42 may also vary as to the size and configuration of raised nodules on the surface of the balls. The nodules may be rounded or pointed to vary the type of massage being applied. The massaging roller balls are drilled half way through to receive wooden shafts or axles 29, 31 (FIG. 5) that slide through apertures 32, 34 in massaging element 12. The wooden shafts 29, 31 function as axles which are inserted laterally through predrilled passages 32, 34 in the horizontal part 33 of base portion 28. The low density polyethylene, rubber or nylon massaging roller balls are snugly slipped onto opposite sides of their respective axles positioned in the base element 28. Base element 28 provides for the mounting of two axles accommodating four massaging roller elements—two on each axle. The diameter of the passages 32, 34 in Adapter 12 are large enough to permit the wooden shafts to rotate, thus permitting the massaging roller ball pairs 36, 38 and 40, 42 to rotate freely. The massaging roller ball pairs (36, 38 and 40, 42) are mounted in tandem and each set or pair rotates independent of the other.

Sliding Tension Spring 44 (see FIG. 4 and FIG. 6) is a parabolic shaped steel spring mounted at one end by a rivet or other suitable fastener 37 on the end 35 of base portion 28 of massaging element 12, thus allowing the parabolic spring to depress, and slide forward while offering resistance to the weight placed upon the bottom side of the massaging roller balls 36, 38, 40, 42.

In this first aspect of the invention a user can effect a non-medical procedure to moderate muscle pain, especially before engaging in athletic activities, to deter development of cramps and after experiencing muscle cramps or spasms, massage the sensitive areas. The two sets of massaging roller balls (36, 38 and 40, 42) with surface protrusions permit the massaging device to move vertically through an arc (a) relative to the longitudinal axis of the handle 14. Preferably arc (a) is fixed at a maximum vertical angle of about 30° for movement of the sleeve or handle adapter 25. This construction permits maximum pressure to be effected while pulling and pushing the massaging rollers up or down and around the affected muscle area. The massaging device, while particularly effective for massaging leg muscles, can also be used on other parts of the body. The telescoping handle permits a user to reach all parts of his or her body.

Referring to FIG. 2 the device 10 of the invention is shown with a solid handle 50, which can be of one or more pieces which can be assembled into a single long handle by threaded connection as is well known in the art. The first end 51 of handle 50 contains a male threaded portion 52, which is adapted to mate with complimentary female threads in a receiver portion 54 of leg lifter/leg cramp alleviating/leg exercising device 56. End 51 of handle 50 could also be fitted with a separate threaded connector. The opposite end 53 of handle 50 can have a like male threaded portion covered by a cap 58. Either end of the handle 50 can be used to mount the leg lifter/leg cramp alleviating/leg exercising device 56 or the roller massaging device 12 of FIG. 4 and FIG. 5. Handle 50 can be manufactured from any suitable structural materials such as plastics, e.g. polypropylene rods, metal rods or tubing, wood and the like. For convenience a multiple piece handle can be manufactured so that the device can be easily stored.

Figure 6:
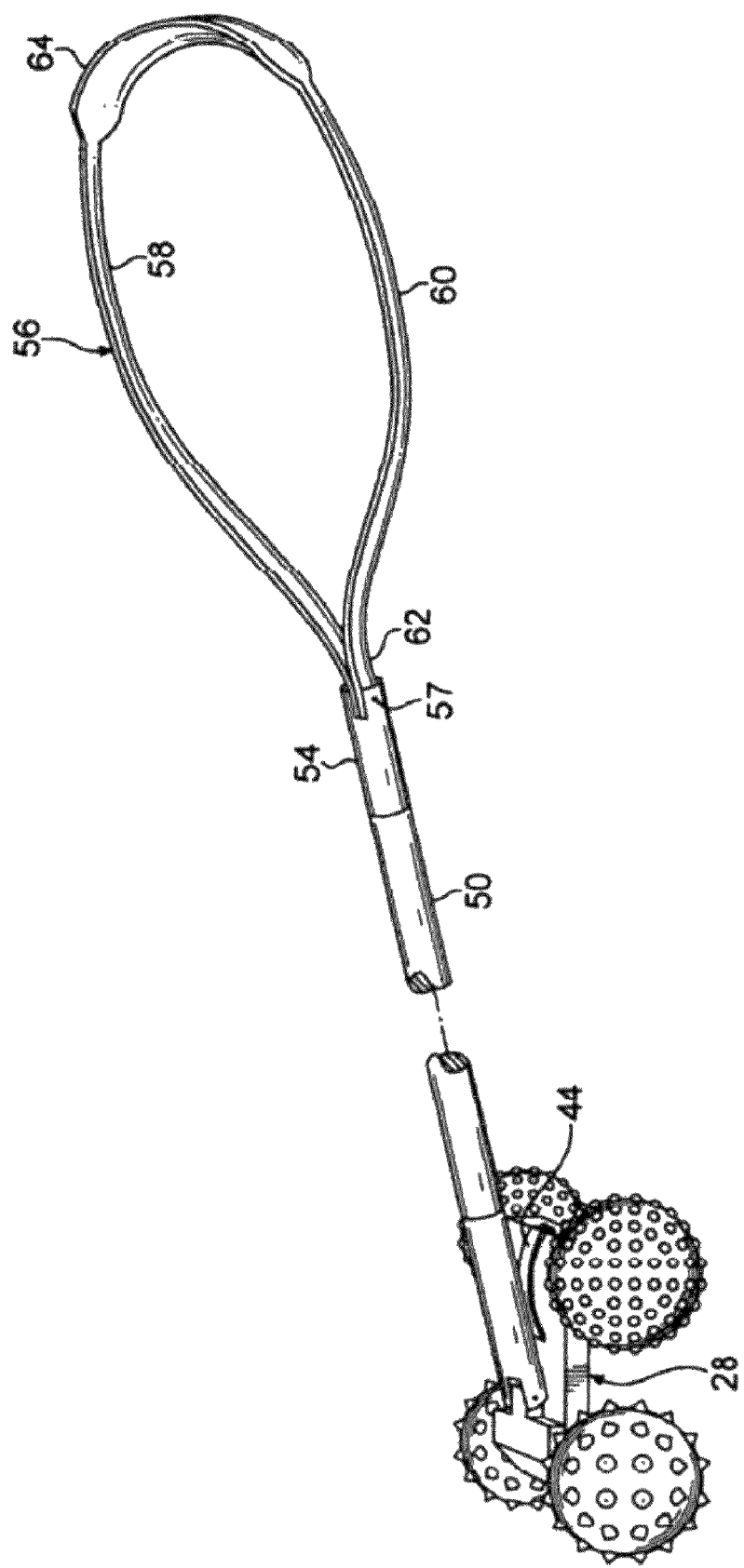
FIG. 6 is a fragmentary isometric view of the apparatus of the invention with both the massaging and leg lifter/leg cramp alleviating/leg exercise elements in place.

The leg lifter/leg cramp alleviating/leg exercising device is shown in more detail in FIG. 2 and FIG. 6. Device 56 consists of a foot supporting member 56 in the form of a loop which is held in a suitable slot in receiver or adapter portion 54 by a pin, bolt or rivet 57. Foot supporting member 56 is preferably manufactured from what is referred to as a conditioned leather. The conditioned leather material has a smooth finish on both the inside 58 and the outside 60 surfaces of the loop. Preferably the foot supporting member or loop 56 is made of a leather having a thickness of approximately 3/16 of an inch, which in the trade is classified as 8/10 ounce material. This particular thickness for the leg lifter/leg cramp alleviating/leg exercising device 56 enables the generally circular configuration shown in FIG. 6 to be maintained except at the end 62 of the loop where it is fastened to the receiver 54. Foot supporting member or loop 56, has an extended or wider, foot receiving portion 64 to aid in comfortably supporting the ball of the foot of a user. The foot supporting member or loop 56 will retain the generally circular configuration and facilitate slipping the loop over a user's foot unless the loop is compressed by an outside force. The retention of the generally circular configuration is important because if a user is experiencing leg cramps while in bed, it would be easy to slip the device with the loop down under the covers and hook it on the ball of the foot. Furthermore, the leather is preferably tanned by a vegetable tanning technique so that there are no residual chemicals in the leather that may cause an allergic reaction when it contacts the skin of a user.

Receiver 54 for mounting the specially shaped conditioned leather loop 56 on either handle 14, 50 has a "slot" cut in one end of the receiver to attach two ends of the leather loop 56 side by side. A transverse hole is drilled through the two sides of the slot in the receiver 54 and a rivet is inserted so as to pass completely through the sides of the slot in receiver 54 and the two ends of leather loop see FIG. 2 and FIG. 6. Optionally a tight fit can be obtained by sliding a slip ring, only slightly larger than the diameter of the slotted portion of receiver 54 over the slotted portion to cover the rivet 57.

The use of a conditioned leather as described above is preferable for the foot supporting member or loop 58. However, other flexible materials may be used so long as they will not result in pinching the users foot or unduly stretching when in use for the intended purpose.

Referring to FIG. 2, when in use a person having a leg cramp or spasm would place the ball of his or her foot in portion 64 of the loop or stirrup 56 so the ball of the foot is cradled by the loop. Depending upon the height of the user the telescoping handle 14 or the multi-piece handle 50 would be positioned so that the leg can be gently put in tension by extending the leg and lifting the foot or pulling it toward the knee to relieve the cramp or spasm.

After the cramp or spasm is relieved, or just for massaging purposes, the massaging roller element 12 can be fixed to the handle 14, 50 such as shown in FIG. 1 or FIG. 6. In this configuration, the massaging roller balls of massaging element 12 can be applied to any affected area, or any area that needs attention by the user. Here again the handle can be adjusted for length to accommodate the muscles being massaged.

As set forth above if the massaging element 12 is turned upside down and placed on a floor or the ground, either attached or unattached to the handle 14, 50, a person sitting in a chair can exercise their feet and/or legs and stimulate blood circulation in both. The user would exert pressure on the massaging roller balls forcing the spring 44 to deflect (flatten) and provide resistance. This would be particularly effective on an airplane to relieve the deleterious effects of prolonged sitting in a confined space as has been well documented.

Furthermore, the device of the present invention is made so it can be easily disassembled, so the components can be used separately if desired and is readily available for travel.

A device according to the invention can be fabricated with components defined as follows.

Handle 14 may be fabricated from 3 sections of telescoping metal tubing or other telescoping structural materials with two locking devices permitting telescoping from about 20 inches to about 46 inches and any length in between. Handle 50 may be sections (at least 2) of suitable structural materials such as plastics, metal rods or tubing, wood and the like, one about 14 inches long and the other about 24 inches long. Each section of the handle could be used with either attachment, separately for massaging or stretching. The individual sections of the handle can be joined together by a male threaded end on one section, which is inserted into a female threaded receiver in the other section of the handle. The combined length of the two sections of the handle would be about 38 inches. Changing the length of each section would permit many lengths of handle for a given user. Threaded caps finish off the threaded ends of each section of the handle when used separately.

A self-sticking nylon or rubber handle wrap may be applied to those portions of the handle, to facilitate gripping the handle, as a matter of personal preference. If the wrap is applied to the telescoping handle, care must be taken so as not to interfere with the sliding action of the handle.

Referring to FIGS. 7-10 a massaging element support device 70 consists of a generally flat bottom portion 72 and a knob like handle or grip portion 74 with a transition portion 76 extending between the bottom 72 and knob portion 74. The particular overall shape of device 70 is critical only to the extent necessary to support massaging elements as will be described below. Device 70 includes an internal threaded bore or aperture 78 with threads adapted to mate with a threaded end of handle 14. Threaded bore 78 is set at an angle to the vertical axis 79 drawn through the device shown in FIG. 7. The handle (not shown) is positioned at an angle so that a user can massage body parts as described above in relation to FIGS. 1-6. The top 74 of device 70 is shaped so that a user can turn the device upside down to use the device as a foot massager by placing the device on a hard surface such as a floor. In a preferred embodiment the handle or grip portion 74 of support device 70 is fabricated from an olefin resin with 50K flex modulus or softer so that the support device 70 functions in a manner similar to the spring actuated massage device shown in FIG. 4. Alternatively the knob like handle or grip portion of support device 70 can be gripped by a user to perform a massage by hand.

Figure 7:
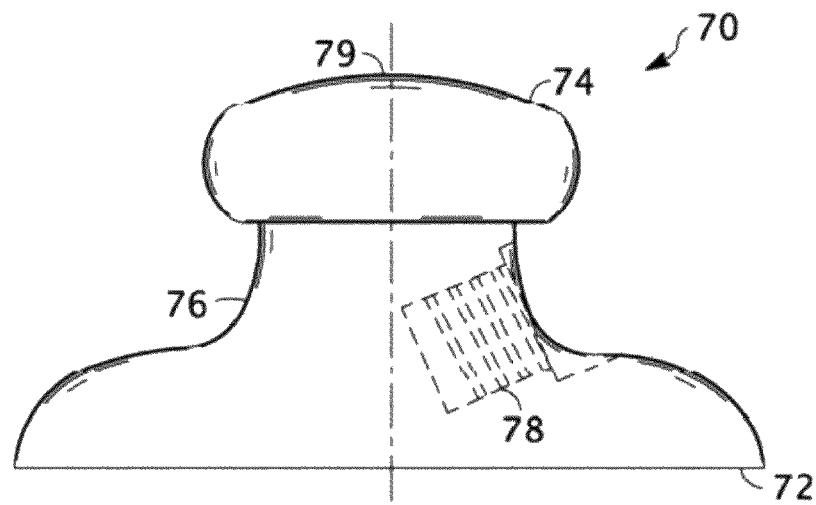
FIG. 7 is a front elevational view of a support member for an alternate massaging device according to the present invention.
Figure 8:
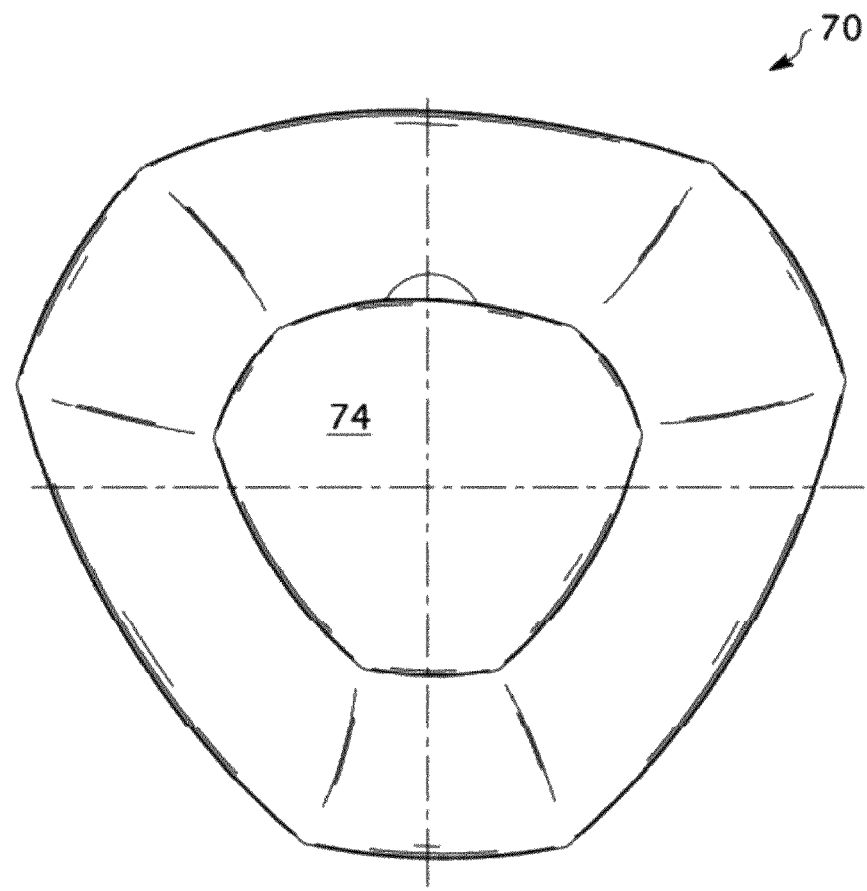
FIG. 8 is a top plan view of the device of FIG. 7.
Figure 9:
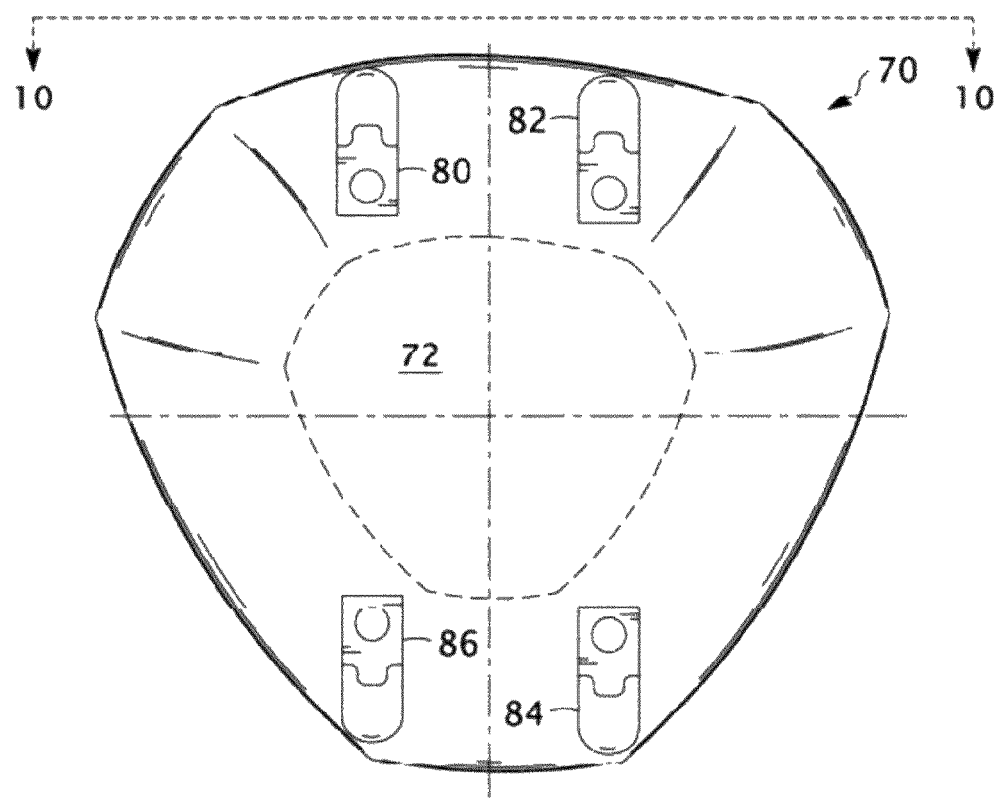
FIG. 9 is a bottom plan view of the device of FIG. 7 illustrating positioning of mounting devices for a flexible massaging element.
Figure 10:
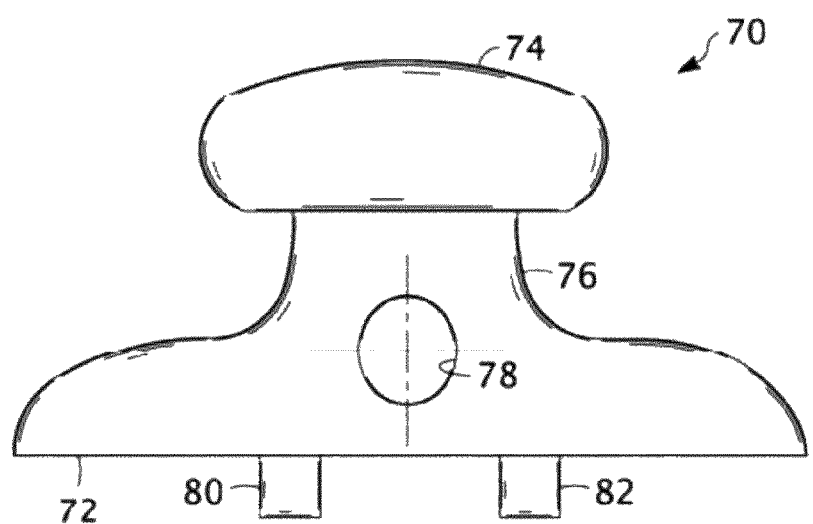
FIG. 10 is a view taken along lines 10-10 of FIG. 9.

As shown in FIG. 9 and FIG. 10 the device of FIG. 7 has clips or mounting devices 80, 82, 84, 86 to support the massage elements of FIGS. 12-16. Referring to FIGS. 11a-11c a single clip 80 is illustrated having a general "L" or hook shape. Clip 80 can have a notch 81 on the base of the "L" or hook and an aperture 83 on the straight portion to receive a fastener such as a screw 85 to fix the chip to the bottom surface of support device 70. Screw 85 is preferably a pan head dual or twin threaded screw that will resist pulling out of the supporting element 70 when the clips 80,82.84,86 are positioned for use.

Figure 19:
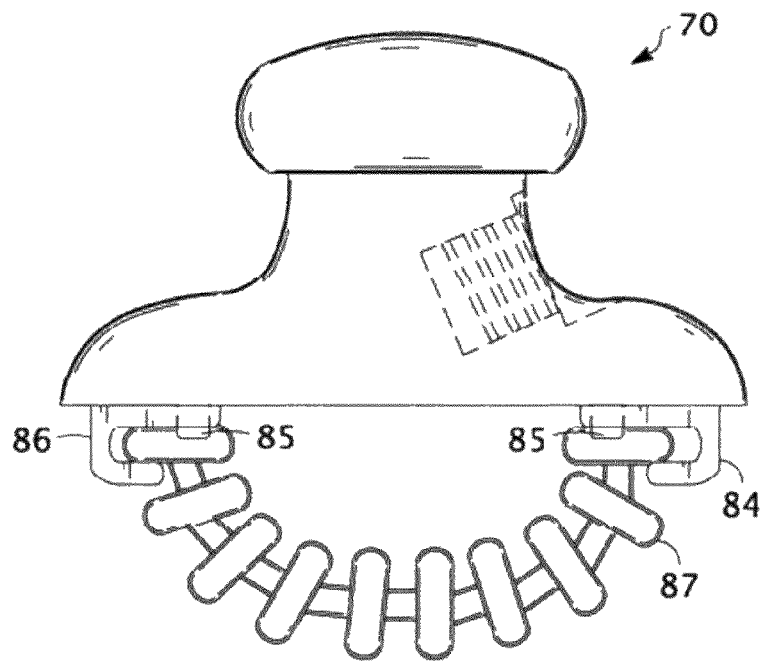
FIG. 19 is a front elevational view of the device of FIG. 7 with supporting a massaging element according to FIGS. 12-14.
Figure 20:
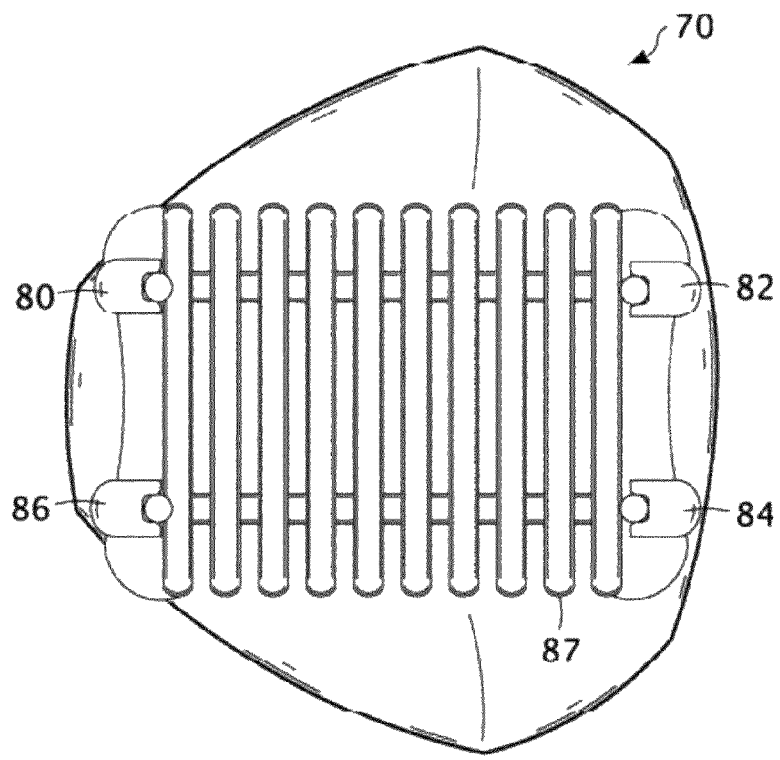
FIG. 20 is a bottom plan view of the device of FIG. 19.

As shown in FIGS. 12-14 one form of massaging element 87 can take the shape of a generally ladder shaped structure consisting of a plurality of generally bone shaped rungs or steps 88, 90, 92, 94, 96, 98 held and separated by supports 100, 102. Element 87 can be fabricated from any flexible material such as olefin thermoplastic materials. As shown in FIGS. 19 and 20 the massaging element 87 is positioned on element support 70 by devices 80-86 so that the element 87 is arranged in a semi-circular pattern to provide an overall flexible massaging element.

As shown in FIGS. 15-16 another form of massaging element 110 can consist of a generally oval shaped base 112 having a plurality of depending finger like massaging elements 114.

Figure 17:
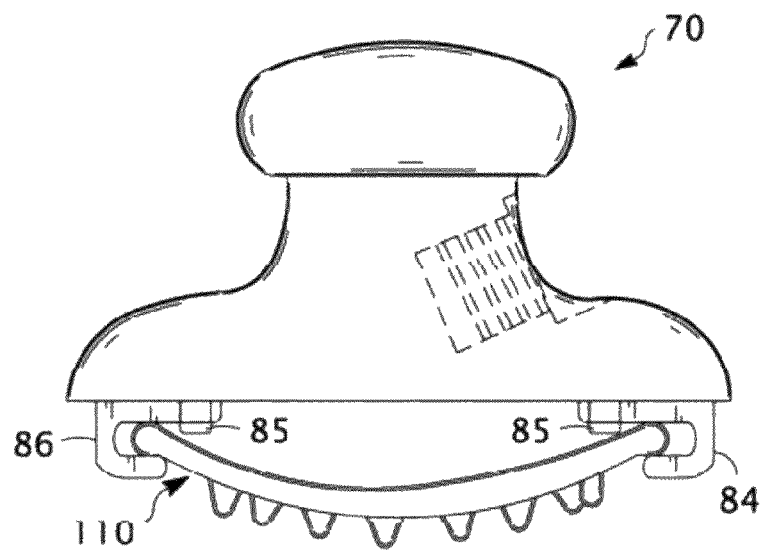
FIG. 17 is a front elevational view of the device of FIG. 7 supporting a massaging element according to FIGS. 16-17.
Figure 18:
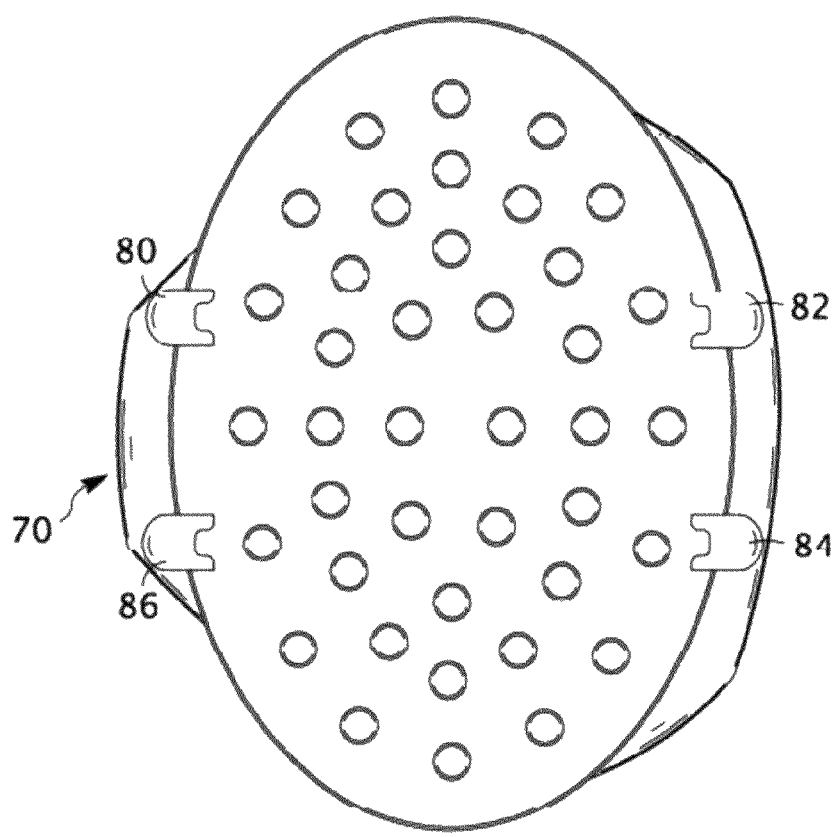
FIG. 18 is a bottom plan view of the device of FIG. 17.

As shown in FIGS. 17 and 18 the massaging element 110 is fixed to massaging element support 70 using chips 80-86 so that the element 110 is held in a semi-circular position to provide an overall flexible massaging element.

The massaging device 70 with a flexible element positioned on end 72 can be held in a users hand by knob portion 74 to facilitate hand massage by a user.

The massaging device 70 can be fixed to a handle such as handle 14 and used as described in connection with the devices of FIGS. 1-6.

The devices of FIGS. 7-19 offer the manufacturer and the user the following benefits:
1. Substitution at anytime of new materials for the massaging elements.
2. Simpler methods of manufacturing
3. Less costly to manufacture.
4. Provides a user with alternate methods to massage muscles.
5. Easier to store and transport. A user can carry the entire device in a small suitcase, brief case, or small bag for use on or in an airplane, bus car, hotel, etc.
6. Finger-type massage with one element.
7. Pressure point massage with either element.
8. Interchangeable massaging heads for different parts of the body and different members of a family.

Having thus described my invention what is desired to be secured by Letters Patent of the United States is set forth in the appended claims.

What is claimed:

1. A two-piece massaging device for permitting a user to perform external body massage, comprising in combination
   a support having a first end to hold separate and distinctly shaped interchangeable non-rotating flexible massaging elements;
   a second end of said support adapted to permit a user to either use the massaging elements interchangeably as a hand-held device or removably position the massaging device with interchangeably massaging elements on a handle; and
   a removable single one piece flexible massaging element removably positioned on a first end of said support said flexible massaging element disposed in an arc-shaped configuration; wherein said flexible massaging element includes a flexible ladder shaped structure disposed in an arc shaped position by said support.

2. A two-piece massaging device for permitting a user to perform external body massage, comprising in combination
   a support having a first end to hold a massaging element;
   a second end of said support adapted to permit a user to either use the massaging elements interchangeably as a hand-held device or removably position the massaging device with interchangeably massaging elements on a handle; and
   a removable single one piece flexible ladder shaped massaging element removably positioned on a first end of said support, said flexible ladder shaped massaging element disposed in an arc-shaped configuration.

* * * * *